(12) United States Patent
James et al.

(10) Patent No.: US 10,178,420 B2
(45) Date of Patent: *Jan. 8, 2019

(54) METHODS, SYSTEMS, AND MEDIA FOR INDICATING VIEWERSHIP OF A VIDEO BASED ON CONTEXT

(71) Applicant: Google LLC, Mountain View, CA (US)

(72) Inventors: Gavin James, Los Angeles, CA (US); Justin Lewis, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,969

(22) Filed: Sep. 11, 2017

(65) Prior Publication Data

US 2017/0374400 A1 Dec. 28, 2017

Related U.S. Application Data

(63) Continuation of application No. 15/086,932, filed on Mar. 31, 2016, now Pat. No. 9,781,457.

(51) Int. Cl.
*G06F 3/00* (2006.01)
*G06F 13/00* (2006.01)
(Continued)

(52) U.S. Cl.
CPC ..... *H04N 21/252* (2013.01); *G06F 17/30828* (2013.01); *G06Q 30/0201* (2013.01); *G06Q 30/0282* (2013.01); *G06Q 50/01* (2013.01); *H04N 21/25891* (2013.01); *H04N 21/44204* (2013.01); *H04N 21/4532* (2013.01); *H04N 21/4661* (2013.01); *H04N 21/4668* (2013.01); *H04N 21/4788* (2013.01)

(58) Field of Classification Search
None
See application file for complete search history.

(56) References Cited

U.S. PATENT DOCUMENTS 9,110,929 B2 8/2015 Garcia et al.
9,396,195 B1 7/2016 Beguelin
(Continued)

OTHER PUBLICATIONS

International Search Report and Written Opinion dated Mar. 9, 2017 in International Patent Application No. PCT/US2016/065604.

(Continued)

*Primary Examiner* — William J Kim
(74) *Attorney, Agent, or Firm* — Byrne Poh LLP (57) ABSTRACT

Methods, systems, and media for indicating viewership of a video are provided. In some embodiments, the method comprises: identifying a video; identifying a group of users connected to a first user of a user device; determining, for each user in the group of users, an affinity score, wherein the affinity score indicates an interaction of the user with the identified video; receiving a request to present, on the user device, a page that includes an indication of the video; in response to receiving the request, determining contextual information related to the request; identifying a subset of users in the group of users connected to the first user based on the affinity score associated with each user and the contextual information; and causing a group of indicators corresponding to the subset of users to be presented on the user device in connection with the indication of the video.

18 Claims, 4 Drawing Sheets

(51) Int. Cl.

| | |
|---|---|
| *H04N 5/445* | (2011.01) |
| *H04H 60/32* | (2008.01) |
| *H04N 21/25* | (2011.01) |
| *H04N 21/258* | (2011.01) |
| *H04N 21/442* | (2011.01) |
| *H04N 21/45* | (2011.01) |
| *H04N 21/466* | (2011.01) |
| *G06Q 30/02* | (2012.01) |
| *G06Q 50/00* | (2012.01) |
| *H04N 21/4788* | (2011.01) |
| *G06F 17/30* | (2006.01) |

(56) References Cited

U.S. PATENT DOCUMENTS

| | | |
|---|---|---|
| 2010/0131385 A1 | 5/2010 | Harrang et al. |
| 2010/0146118 A1 | 6/2010 | Van Wie |
| 2012/0078916 A1 | 3/2012 | Tseng |
| 2013/0262320 A1 | 10/2013 | Makanawala et al. |
| 2014/0214895 A1 | 7/2014 | Higgins et al. |
| 2014/0279039 A1 | 9/2014 | Systrom et al. |
| 2014/0297739 A1 | 10/2014 | Stein et al. |
| 2015/0058751 A1 | 2/2015 | Tseng |
| 2015/0231119 A1 | 8/2015 | Cooymans et al. |
| 2015/0324827 A1 | 11/2015 | Upstone et al. |

OTHER PUBLICATIONS

Notice of Allowance dated May 15, 2017 in U.S. Appl. No. 15/086,932.
Office Action dated Jan. 25, 2017 in U.S. Appl. No. 15/086,932.
Office Action dated Dec. 8, 2016 in U.S. Appl. No. 15/086,932.

METHODS, SYSTEMS, AND MEDIA FOR INDICATING VIEWERSHIP OF A VIDEO BASED ON CONTEXT

CROSS-REFERENCE TO RELATED APPLICATIONS

This application is a continuation of U.S. patent application Ser. No. 15/086,932, filed Mar. 31, 2016, which is hereby incorporated by reference herein in its entirety.

TECHNICAL FIELD

The disclosed subject matter relates to methods, systems, and media for indicating viewership of a video based on context.

BACKGROUND

Many users browse video sharing sites to find and watch a video. For example, a user may browse a listing of available videos, and the listing may include the title of the video, a genre of the video, and other information. It can be difficult for the user to determine whether they are likely to enjoy the video. However, knowing that friends of the user have watched the video or liked the video can allow the user to decide that they are likely to enjoy the video.

Accordingly, it is desirable to provide methods, systems, and media for indicating viewership of a video based on context.

SUMMARY

Methods, systems, and media for indicating viewership of a video based on context are provided. In accordance with some embodiments of the disclosed subject matter, a method for indicating viewership of a video is provided, the method comprising: identifying a video from a plurality of videos; identifying a group of users connected to a first user of a user device; determining, for each user in the group of users, an affinity score, wherein the affinity score indicates an interaction of the user with the identified video; receiving a request to present, on the user device, a page that includes an indication of the video; in response to receiving the request, determining contextual information related to the request; identifying a subset of users in the group of users connected to the first user based on the affinity score associated with each user and the contextual information; and causing a group of indicators corresponding to the subset of users to be presented on the user device in connection with the indication of the video.

In accordance with some embodiments of the disclosed subject matter, a system for indicating viewership of a video is provided, the system comprising: a hardware processor that is programmed to: identify a video from a plurality of videos; identify a group of users connected to a first user of a user device; determine, for each user in the group of users, an affinity score, wherein the affinity score indicates an interaction of the user with the identified video; receive a request to present, on the user device, a page that includes an indication of the video; in response to receiving the request, determine contextual information related to the request; identify a subset of users in the group of users connected to the first user based on the affinity score associated with each user and the contextual information; and cause a group of indicators corresponding to the subset of users to be presented on the user device in connection with the indication of the video.

In accordance with some embodiments of the disclosed subject matter, a non-transitory computer-readable medium containing computer executable instructions that, when executed by a processor, cause the processor to perform a method for indicating viewership of a video is provided. The method comprises: identifying a video from a plurality of videos; identifying a group of users connected to a first user of a user device; determining, for each user in the group of users, an affinity score, wherein the affinity score indicates an interaction of the user with the identified video; receiving a request to present, on the user device, a page that includes an indication of the video; in response to receiving the request, determining contextual information related to the request; identifying a subset of users in the group of users connected to the first user based on the affinity score associated with each user and the contextual information; and causing a group of indicators corresponding to the subset of users to be presented on the user device in connection with the indication of the video.

In accordance with some embodiments of the disclosed subject matter, a system for indicating viewership of a video is provided, the system comprising: means for identifying a video from a plurality of videos; means for identifying a group of users connected to a first user of a user device; means for determining, for each user in the group of users, an affinity score, wherein the affinity score indicates an interaction of the user with the identified video; means for receiving a request to present, on the user device, a page that includes an indication of the video; in response to receiving the request, means for determining contextual information related to the request; means for identifying a subset of users in the group of users connected to the first user based on the affinity score associated with each user and the contextual information; and means for causing a group of indicators corresponding to the subset of users to be presented on the user device in connection with the indication of the video.

In some embodiments, the system further comprises means for ranking the users in the subset of users, wherein an order of indicators within the group of indicators is determined based on the ranking.

In some embodiments, the affinity score further indicates an interest of the user in a topic associated with the identified video.

In some embodiments, the system further comprises means for determining, for each user in the group of users, a second affinity score, wherein the second affinity score indicates a strength of a relationship between the user and the first user of the user device, and wherein identifying the subset of users is based at least in part on the second affinity score.

In some embodiments, the contextual information indicates a navigation history on the user device, wherein the navigation history indicates a page viewed prior to receiving the request to present the page that includes the indication of the video.

In some embodiments, the system further comprises: means for determining, based on the navigation history, that the request to present the page that includes the indication of the video was received based on a selection of an endorsement by a second user of the identified video; and means for causing the second user to be included in the subset of users.

BRIEF DESCRIPTION OF THE DRAWINGS

Various objects, features, and advantages of the disclosed subject matter can be more fully appreciated with reference

DETAILED DESCRIPTION

In accordance with various embodiments, mechanisms (which can include methods, systems, and media) for indicating viewership of a video based on context are provided.

In some embodiments, the mechanisms described herein can cause indications of viewers who have previously viewed, endorsed, shared, and/or received suggestions to view a particular video to be presented to a first user. For example, in some embodiments, the viewership indicators can be presented on a page that includes an identifier of the video (e.g., a thumbnail image associated with the video, and/or any other suitable type of identifier of the video). In some embodiments, the page can include a listing of several videos, for example, to allow the first user to browse the listing of videos. Additionally or alternatively, in some embodiments, the page can correspond to a watch page for the video, for example, a page that includes a video player window in which the video is presented.

In some embodiments, the viewers can correspond to connections of the first user, such as those who are directly connected to the first user on a social networking service, belong to the same group on a social networking service, and/or have any other suitable connection to the first user. In some embodiments, the indications can include a name of the viewer and/or an image representing the viewer, and the indications can be presented in connection with an identifier of the particular video, thereby allowing the first user browsing the list of videos to quickly identify friends who have watched and/or endorsed the video.

In some embodiments, the mechanisms can identify the viewers associated with the presented indications based on any suitable information. For example, in some embodiments, the viewers can be identified based on the viewer's interest in the particular video, the viewer's interest in a topic related to the particular video, and/or based on any other suitable information. As another example, in some embodiments, the viewers can be identified based on contextual information indicating a navigation history that includes pages visited by the first user prior to visiting the page that includes the viewership indicators. As a more particular example, in instances where the first user navigates to a page associated with the video from an indication of an endorsement of the video by a second user (e.g., an indication that the second user enjoyed the video, shared the video on a social networking service, commented on the video, and/or endorsed the video in any other suitable manner), the mechanisms can cause the second user to be included in the group of viewers associated with the viewership indicators. As yet another example, in some embodiments, the viewers can be identified based on a strength of a relationship between the viewer and the first user. As a more particular example, in some embodiments, the strength of the relationship can be determined based on a number of times the viewer and the first user have interacted (e.g., a number of messages sent in a particular communication interface, and/or any other suitable metric), a frequency of interaction, a number of shared common interests (e.g., a number of common interests indicated on a social networking service, and/or any other suitable metric of common interests), a type of connection on a social networking service, and/or any other suitable information. In some embodiments, the mechanisms can identify the viewers and/or rank the viewers based on any suitable combination of information.

Note that, although the mechanisms described herein relate to indicating viewership of a video, in some embodiments, the mechanisms can be used to indicate viewership of any suitable type of media content, such as audio content (e.g., music, radio programs, audiobooks, and/or any other suitable type of audio content), television programs, movies, live streaming media content, electronic books, and/or any other suitable type of media content.

Figure 1:
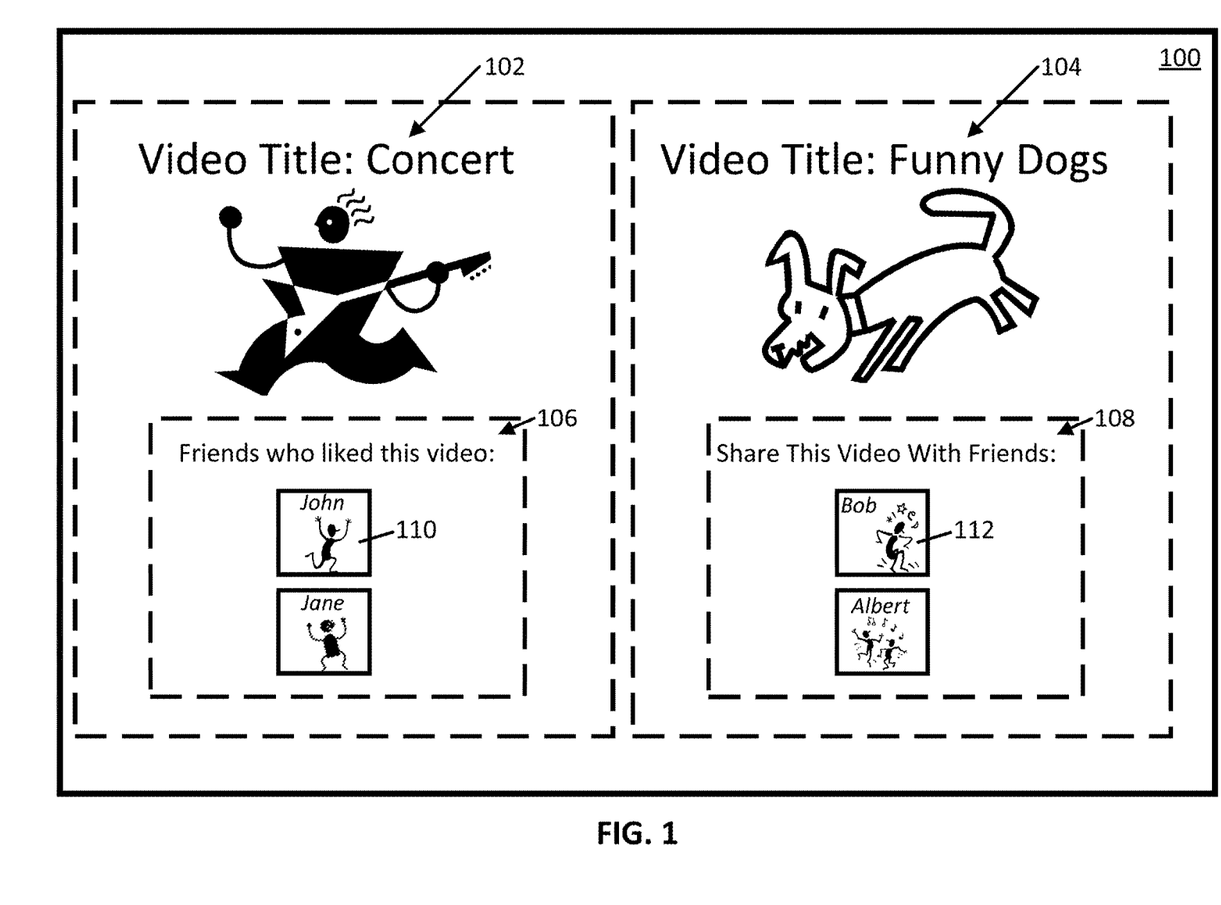
FIG. 1 shows an example of a user interface for indicating viewership of a video based on context in accordance with some embodiments of the disclosed subject matter.

Turning to FIG. 1, an example 100 of a user interface for indicating viewership of a video is shown in accordance with some embodiments of the disclosed subject matter. As illustrated, user interface 100 can include video thumbnails 102 and 104 and groups of user indicators 106 and 108.

Video thumbnails 102 and 104 can correspond to any suitable videos and can indicate any suitable information about the videos. For example, as shown in FIG. 1, in some embodiments, video thumbnails 102 and 104 can indicate a title of the video and can include an image representing the video (e.g., a screen capture from the video, an image representing a creator of the video, and/or any other suitable image). In some embodiments, video thumbnails 102 and 104 can include any other suitable information, such as a creator of the video, a date associated with the video, a number of times the video has been viewed, and/or any other suitable information.

In some embodiments, video thumbnails 102 and 104 can be presented based on any suitable information. For example, in some embodiments, video thumbnails 102 and 104 can be presented on a page suitable for browsing a collection of videos, where each video thumbnail indicates an available video. As a more particular example, in some embodiments, the page can correspond to a particular channel or category of media content (e.g., media content associated with a particular creator, television channel, music group, and/or any other suitable entity). As another example, in some embodiments, video thumbnails 102 and/or 104 can be presented in a message (e.g., a message posted on a social networking site) and/or an online chat. As a more particular example, video thumbnails 102 and/or 104 can be included in a message and/or chat when a user includes a link to a corresponding video in the message and/or chat comment. Note that, although two video thumbnails are shown in FIG. 1, in some embodiments, any suitable number (e.g., zero, one, five, and/or any other suitable number) can be included.

Groups of user indicators 106 and 108 can each include one or more user indicators, such as user indicators 110 and 112. In some embodiments, a group of user indicators can indicate users who have previously viewed and endorsed the video corresponding to the video thumbnail (e.g., group of user indicators 106). Additionally or alternatively, in some embodiments, a group of user indicators can indicate users with whom the user viewing user interface 100 may want to share the corresponding video (e.g., group of user indicators 108). Note that, although one group of user indicators is shown in connection with each video thumbnail, in some embodiments, any suitable number of groups of user indicators (e.g., zero, one, two, five, and/or any other suitable number) can be included.

As described below in connection with FIG. 4, users corresponding to the user indicators presented in user interface 100 can be selected based on any suitable information or combination of information. For example, in some embodiments, the users can be selected based on a determined affinity for the video (e.g., based on whether the user has shared, and/or endorsed the video, based on whether the user has shared and/or endorsed a related video, and/or based on any other suitable information) and/or a determined affinity for a topic related to the video (e.g., based on whether the user has expressed interested in the topic, whether the user has previously watched other videos related to the video, and/or based on any other suitable information). As another example, in some embodiments, the users can be selected based on contextual information, such as a navigation history indicating pages visited prior to a page associated with user interface 100. As a more particular example, in some embodiments, a particular user can be included in the group of indicators if it is determined that the page associated with user interface 100 was navigated to based on selection of an indication of endorsement of the video by the particular user on another page, as described below in connection with block 410 of FIG. 4. As yet another example, in some embodiments, the users can be determined based on a strength of a relationship between the users and a viewer of user interface 100. In some embodiments, the information can be combined in any suitable manner to select the users and/or to rank the users to present the user indicators in any suitable order or visual manner, as described below in connection with block 412 of FIG. 4.

Note that, in some embodiments, rather than being presented in a page suitable for browsing videos (e.g., as in user interface 100 of FIG. 1), the user indicators can be presented in a watch page associated with a particular video. For example, in some embodiments, the watch page can be one in which the particular video is presented in a video player window. In some such embodiments, the user indicators can be presented adjacent to the video player window, and/or in any other suitable location.

Figure 2:
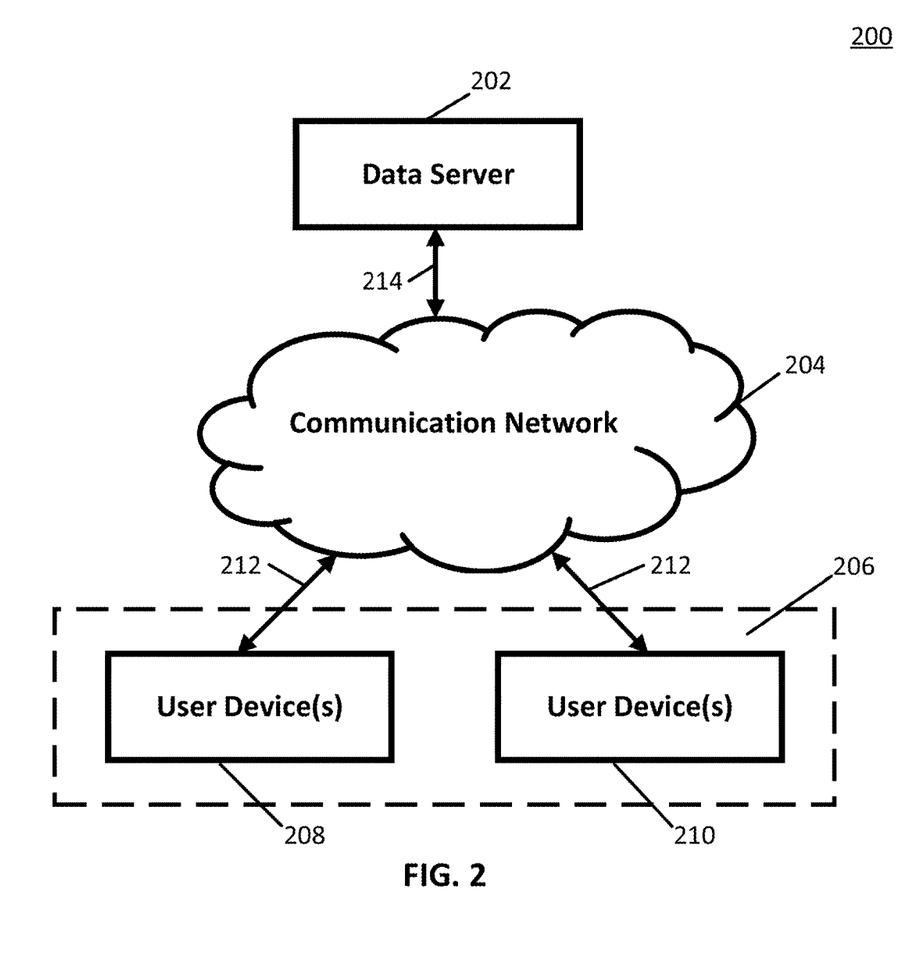
FIG. 2 shows a schematic diagram of an illustrative system suitable for implementation of mechanisms described herein for indicating viewership of a video based on context in accordance with some embodiments of the disclosed subject matter.

Turning to FIG. 2, an example 200 of hardware for indicating viewership of a video based on context that can be used in accordance with some embodiments of the disclosed subject matter is shown. As illustrated, hardware 200 can include one or more servers such as a data server 202, a communication network 204, and/or one or more user devices 206, such as user devices 208 and 210.

In some embodiments, data server 202 can be any suitable server for storing information relating to users who have viewed a video, users who have endorsed a video, users who have tagged a connection to view a video, and/or any other suitable information. In some embodiments, data server 202 can use the stored information to create indications of users who have viewed, endorsed, and/or recommended a particular video. For example, in some embodiments, the indications can be presented to a first user, for example, if the first user is browsing a list of videos. In some such embodiments, the users who have viewed, endorsed, and/or recommended the particular video can be friends of the first user. In some embodiments, data server 202 can additionally maintain any suitable lists and/or graphs of relationships between users that can be used to create the indications of users who have viewed, endorsed, and/or recommended the video. In some embodiments, data server 202 can identify connections of the first user based on a strength of a relationship between the first user and the connection, a browsing history of the first user, shared interests between the first user and the connection, and/or any other suitable information, as described below in connection with FIG. 4. In some embodiments, data server 202 can be omitted.

Communication network 204 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to data server 202. Communications links 212 and/or 214 can be any communications links suitable for communicating data among user devices 206 and server 202 such as network links, dial-up links, wireless links, hard-wired links, any other suitable communications links, or any suitable combination of such links.

In some embodiments, user devices 206 can include one or more computing devices suitable for browsing a listing of videos, viewing a video, viewing recommendations of videos, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although data server 202 is illustrated as one device, the functions performed by data server 202 can be performed using any suitable number of devices in some embodiments. For example, in some embodiments, multiple devices can be used to implement the functions performed by data server 202.

Although two user devices 208 and 210 are shown in FIG. 2, any suitable number of user devices, and/or any suitable types of user devices, can be used in some embodiments.

Data server 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
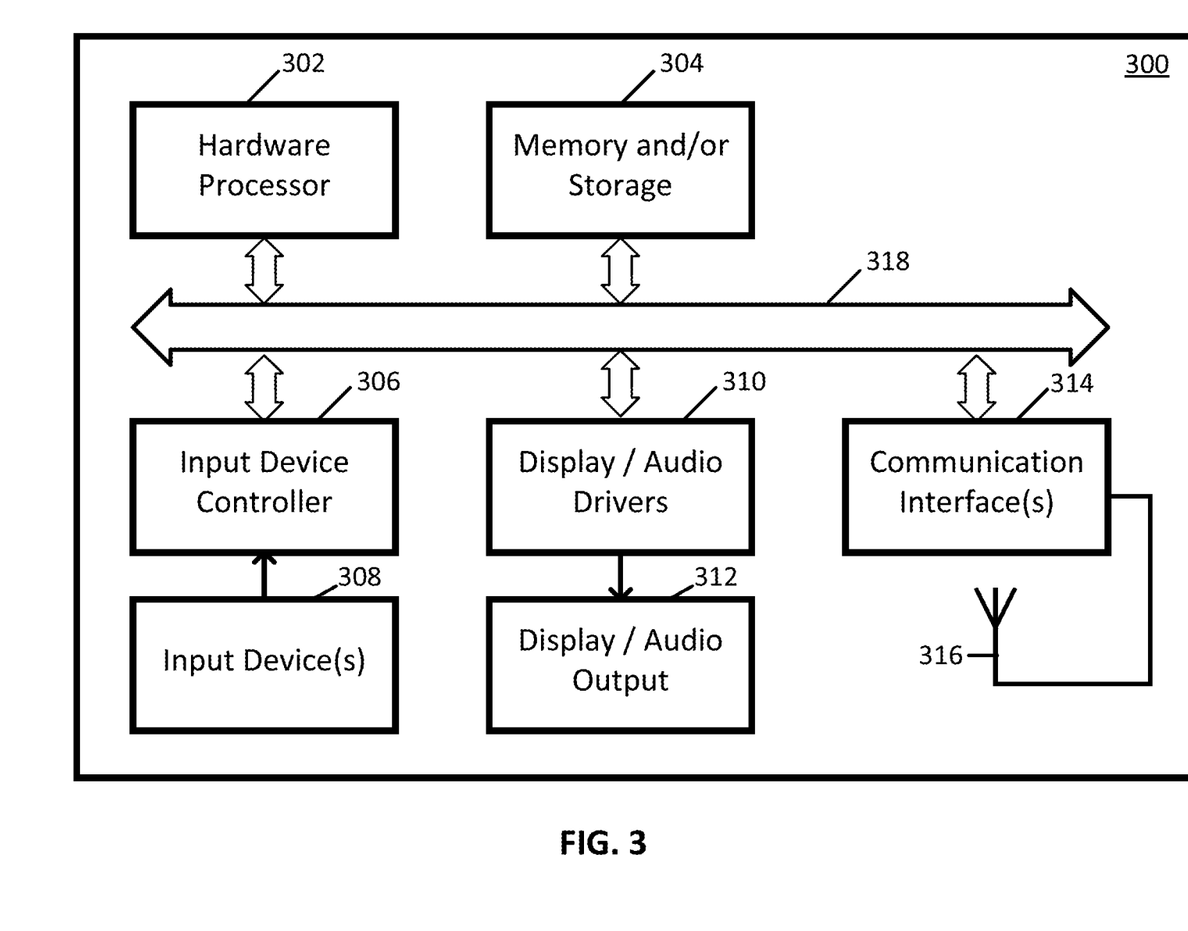
FIG. 3 shows a detailed example of hardware that can be used in a server and/or a user device of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to store indications of users who have viewed, endorsed, and/or recommended a video, present an indication of connections of a user who have viewed, endorsed, and/or recommended the video, and/or perform any other suitable actions. In some embodiments, hardware processor 302 can be controlled by a computer program stored in memory and/or storage 304 of user device 206. For example, the computer program can cause hardware processor 302 to present indications of users who have viewed, endorsed, and/or recommended a video, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
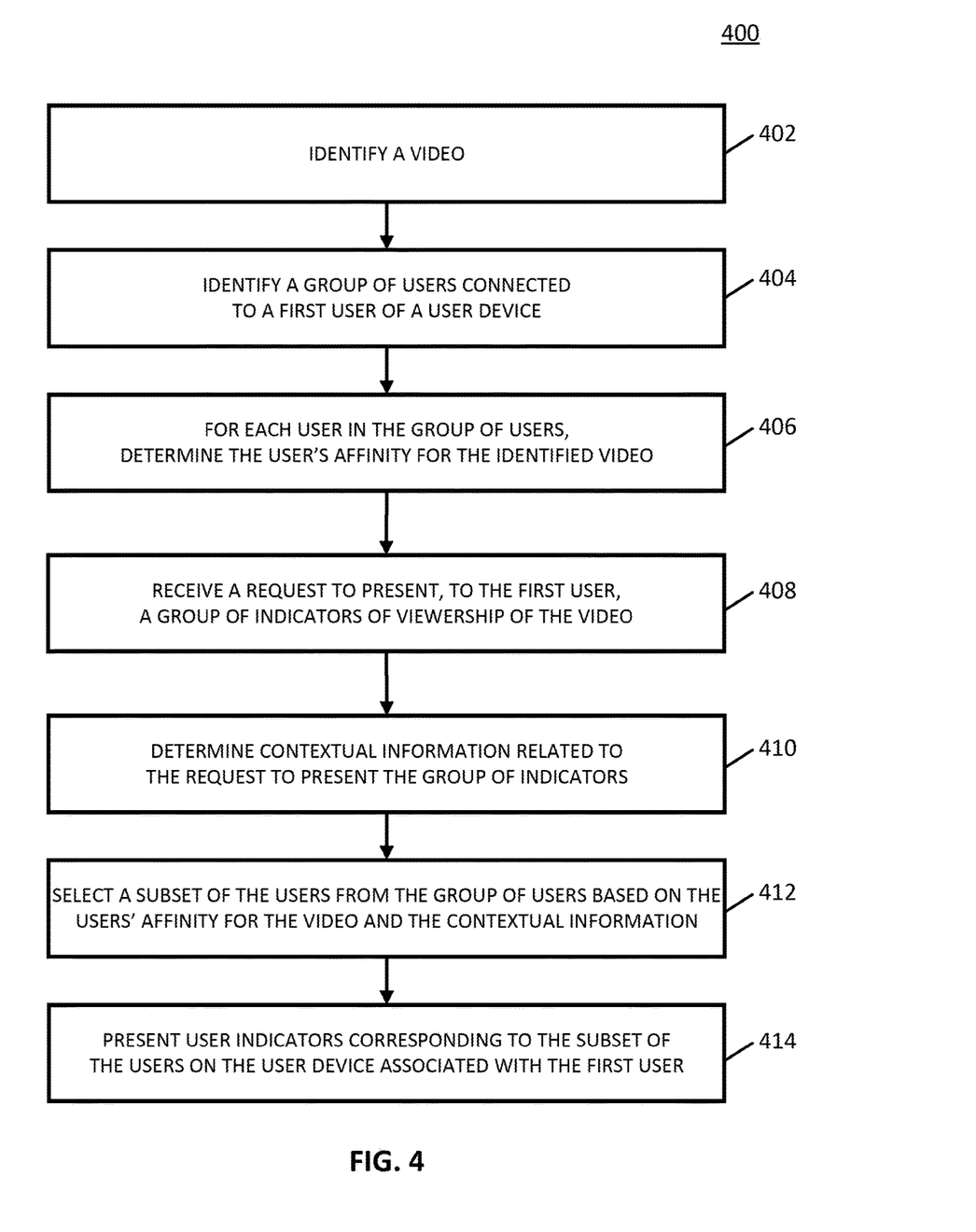
FIG. 4 shows an example of a process for indicating viewership of a video based on context in accordance with some embodiments of the disclosed subject matter.

Turning to FIG. 4, an example 400 of a process for presenting indicators of viewership of a video based on context is shown in accordance with some embodiments of the disclosed subject matter. In some embodiments, blocks of process 400 can be implemented on data server 202 and/or user device 206.

Process 400 can begin by identifying a particular video at 402 for which indicators of viewership are to be presented. Process 400 can identify the video using any suitable technique(s) and based on any suitable information. For example, in some embodiments, the video can be one included in a video sharing service home page presented to a particular user authenticated with a corresponding user account. As a more particular example, in some embodiments, the video can be associated with a collection of media content that the user has subscribed to, a video that was shared with a user (e.g., in a comment associated with a post on a social networking service, included in a message to the user, and/or shared in any other suitable manner), a video that is recommended for the user based on previously viewed content, a video that has been determined to be a currently popular video (e.g., has received more than a predetermined number of views within a recent time period, and/or identified using any other suitable popularity metrics), and/or any other suitable video.

Process 400 can identify a group of users connected to a first user of a user device at 404. Each user in the group of users can be connected to the first user directly or indirectly. For example, in some embodiments, users who are directly connected may be direct connections on any suitable social networking service, have directly exchanged messages through any suitable communication interface (e.g., an instant messaging interface, e-mail, and/or any other suitable communication interface), and/or be directly connected in any other suitable manner. As another example, users who are indirectly connected may both belong to the same group on a social networking service, both be subscribed to the same channel of media content on a video sharing service, have a direct connection in common with both users, and/or be indirectly connected in any other suitable manner. Process 400 can identify the group of users connected to the first user using any suitable technique or combination of techniques. For example, in some embodiments, process 400 can identify direct connections of the user on multiple networking platforms (e.g., one or more communication interfaces, social networking services, video sharing services, and/or any other suitable networking platforms). As another example, in some embodiments, process 400 can identify indirect connections and/or suggested connections by identifying groups the first user belongs to, connections separated from the first user by any suitable degree on a networking platform, and/or based on any other suitable information.

At 406, for each user in the group of users, process 400 can determine an affinity score for the user and the video identified at block 402. Process 400 can determine the affinity score based on any suitable information and using any suitable technique(s). For example, in some embodiments, the affinity score can be based on whether the user has viewed the video, has shared the video (e.g., in a social networking post), has subscribed to a collection of media content associated with the video, has endorsed a collection of media content associated with the video, has commented on the video, has viewed other videos determined to be similar (e.g., created by the same entity, related to a similar topic, and/or similar in any other suitable manner) to the identified video, and/or has interacted with the video in any other suitable manner. In instances where the user has interacted with the video in multiple instances (e.g., commented on the video and endorsed the video), process 400 can weigh the interactions in any suitable manner to calculate the affinity score based on the multiple interactions. For example, in some embodiments, endorsements can be weighed more heavily than viewing content, sharing content can be weighed more heavily than commenting on content, etc. Note that, in some embodiments, multiple affinity scores can be calculated for each of multiple types of interaction, and, in some such embodiments, each affinity score can be a Boolean value. For example, in some embodiments, an affinity score indicating whether the user has endorsed content associated with the channel of media content or the video can be a Boolean value, where a value of "true" indicates that the user has endorsed the content and a value of "false" indicates that the user has not endorsed the content. Note that, in some embodiments, the affinity score between a user and a video can indicate a particular category the user belong to with respect to the video, such as a relatively high affinity for the video (e.g., the user is likely to enjoy the video), a relatively low affinity for the video (e.g., the user is unlikely to enjoy the video and/or it is unknown whether the user is likely to enjoy the video), and/or any other suitable categories.

In some embodiments, Process 400 can store the affinity score(s) in any suitable location, for example, in memory 304 of data server 202. As a more particular example, in some embodiments, the affinity score(s) can be stored in a cache within memory 304 of data server 202. In some such embodiments, the affinity score(s) can be stored in the cache for any suitable time period (e.g., a day, a week, a month, and/or any other suitable time period).

Note that, in some embodiments, process 400 can repeat blocks 402-406 for any suitable videos and can store the determined affinity score(s) for later use. For example, in some embodiments, the determined affinity score(s) can be retrieved in response to receiving a request to present a page that includes an indicator of a particular video, as described below.

At 408, process 400 can receive a request to present, on the user device associated with the first user, a group of viewership indicators corresponding to the video identified at block 402. Process 400 can receive the request based on any suitable action(s). For example, in some embodiments, process 400 can receive the request in response to a determination that the user has navigated to a particular page on the user device. As a more particular example, the page can include a home page corresponding to a user account of the user on a video sharing service or social networking service, a page corresponding to a particular collection of media content or a particular video (e.g., the collection of media content or the video described above in connection with block 402), and/or any other suitable page.

Process 400 can determine contextual information related to the request to present the group of viewership indicators at 410. For example, in some embodiments, the contextual information can indicate a type of page on which the group of viewership indicators are to be presented. As a more particular example, the type of page can indicate content to be presented on a page the user device navigated to, as described above in connection with block 408. As a specific example, the page can correspond to a particular channel of media content and/or any other suitable collection of media content. As another specific example, the page can correspond to a home page of a video sharing service. As yet another specific example, the page can correspond to a post on a social networking service.

As another example, in some embodiments, the contextual information can indicate navigation history indicating a manner in which the page on which the viewership indicators are to be presented was reached. As a more particular example, in some embodiments, the navigation history can indicate that the user device navigated to a page for presenting the video from an endorsement of the video by a second user connected to the first user. In some embodiments, the endorsement can include a comment on the video, sharing the video in a post on a social networking service, selecting an icon indicating the second user enjoyed the video, and/or any other suitable type of endorsement. As another more particular example, in some embodiments, the navigation history can indicate that the user navigated to the page from a page indicating a collection of media content created by a second user connected to the first user. In some embodiments, the collection of media content can include a channel of media content that includes media content related to a particular topic and/or created by a particular entity, a collection of media content aggregated by the second user, and/or any other suitable collection of media content.

Note that, in some embodiments, the navigation history can indicate previously viewed pages and/or previous actions leading to the current request to present the group of viewership indicators in any suitable manner. For example, in some embodiments, the navigation history can include one or more source identifiers, where each source identifier indicates a previously viewed page. In some embodiments, each source identifier can include information such as a Universal Resource Locator (URL) associated with the page, a domain name associated with the page, and/or any other suitable information. In some embodiments, the source identifier can additionally or alternatively indicate user actions. For example, in some embodiments, the source identifier can indicate that an icon indicating a user's endorsement of content was selected, and the request received at block 408 was transmitted in response to the icon being selected on the user device.

At 412, process 400 can select a subset of users out of the group of users based on the users' affinity for the video determined at block 406 and the contextual information determined at block 410. Process 400 can select the subset of users based on any suitable information related to the user's affinity for the video and/or the contextual information. For example, in some embodiments, process 400 can select the subset of users based on each user's interest in the video and/or a topic related to the video. As a more particular example, in some embodiments, process 400 can include users in the subset of users who are determined to be interested in a topic related to the video based on videos the user has previously viewed, groups the user belong to on a social networking service, collections of media content the user has subscribed to, other videos the user has interacted with (e.g., commented on, shared, endorsed, and/or interacted with in any other suitable manner), and/or based on any other suitable information. In some embodiments, process 400 can determine that previously viewed content and/or groups the user belongs to are related to the video based on any suitable information, such as metadata associated with the content and/or the video, titles associated with the content and/or groups, names of creators of the previously viewed content, and/or any other suitable information. In some embodiments, process 400 can select the users in the subset by sorting the users in the group of users based on the affinity score(s) calculated at block 406 and then selecting the top N (e.g., two, five, ten, and/or any other suitable number) users.

As another example, in instances where process 400 determines that the video was endorsed by a participant in an online conversation (e.g., an online chat, a comment thread on a post on a social networking service, an e-mail chain, and/or any other suitable type of conversation) in the context of the conversation, process 400 can include one or more users associated with the conversation in the subset of users. In some embodiments, the video can be determined to be endorsed in the context of the conversation in any suitable manner. For example, in some embodiments, process 400 can determine that a participant in the online conversation included a link to the video, embedded the video in the conversation, selected an icon indicating enjoyment of the video, mentioned enjoying the video, recommended the video to another user, and/or endorsed the conversation in any other suitable manner. In some embodiments, process 400 can cause the one or more users included in the conversation to be ranked higher within the subset of users relative to other users in the subset.

As yet another example, in instances where process 400 determines that the video was included in a collection of videos aggregated by a second user (e.g., as a playlist of videos, as a channel of media content, and/or aggregated in any other suitable manner), process 400 can include the second user in the subset of users. In some embodiments, process 400 can determine a strength of a relationship between the second user and the first user prior to including the second user in the subset of users. For example, in some embodiments, process 400 can determine that the second user is to be included in the subset of users if the second user and the first user are directly connected on a social networking service. Other examples of information used to determine a strength of a relationship between two users are described in more detail below. Note that, in instances where the collection of videos was created by multiple users, process 400 can include any suitable number (e.g., none, one, two, all, and/or any other suitable number) of the multiple users in the subset of users corresponding to the viewership indicators.

As still another example, in instances where process 400 determines that a collection of media content that includes the video was subscribed to by a particular user and/or endorsed by a particular user, process 400 can include the second user in the subset of users. As a more particular example, in some embodiments, process 400 can determine that the second user has endorsed the collection of media content by determining, for example, that the second user has indicated enjoyment of content included in the collection, has shared the collection of media content (e.g., in a post on a social networking site), has viewed more than a predetermined number of content items included in the collection (e.g., more than 25%, more than 50%, all of the content items, and/or any other suitable number or percentage), and/or endorsed the collection of media content in any other suitable manner.

As still another example, in some embodiments, process 400 can select the subset of users based on navigation history. As a more particular example, in instances where the viewership indicators are to be presented on a page that was navigated to on a user device associated with the first user from an endorsement of the video by a second user, process 400 can cause the second user to be included in the subset of users. As another more particular example, in instances where the viewership indicators are to be presented on a page that was navigated to on a user device associated with the first user from a page associated with a collection of media content aggregated by a second user, process 400 can cause the second user to be included in the subset of users. In some embodiments, process 400 can cause the second user to be ranked higher within the subset of users relative to other users in the subset.

In some embodiments, process 400 can rank the users included in the subset of users. As described above, in some embodiments, users who are determined to be particularly interested in a topic related to the video and/or videos who have endorsed the video in a particular context can be ranked relatively higher in the subset of users relative to other users.

Additionally or alternatively, in some embodiments, process 400 can rank the users included in the subset of users based on any other suitable information. For example, in some embodiments, process 400 can rank the users based on a strength of a relationship between each user in the subset and the first user associated with the user device. In some embodiments, the strength of the relationship can be determined based on any suitable information, such as a number of messages exchanged within a communication interface (e.g., a number of e-mails, a number of messages in an online chat, a number of times one of the users has commented on a post on a social networking service created by the other user, and/or any other suitable metric of number of messages exchanged), a frequency of interaction (e.g., a frequency with which the users exchange online messages, and/or any other suitable frequency metric), a number of groups both users belong to, whether the users are directly connected on a social networking service (e.g., having indicated their friendship, and/or directly connected in any other suitable manner), and/or based on any other suitable information. In some embodiments, process 400 can cause users in the subset of users with a stronger relationship to the first user to be ranked relatively higher within the subset of users. In some embodiments, process 400 can combine information indicating the strength of the relationship with information indicating a user's interest in the video (e.g., as described above in connection with block 406) and/or contextual information related to the request to present the page (e.g., as described above in connection with block 410) in any other suitable manner.

In some embodiments, the subset of users can include any suitable number (e.g., two, five, ten, twenty, and/or any other suitable number) of users. In some embodiments, process 400 can use rankings of the users within the subset of users to reduce the subset of users to a predetermined number.

Note that, in some embodiments, the subset of users can be selected on any suitable device, such as data server 202 and/or user device 206. In instances where the subset of users is selected by user device 206, information used to select the subset of users can be transmitted to user device 206, for example, by data server 202. For example, in some embodiments, the information received by user device 206 can include the contextual information, user affinity scores, and/or any other suitable information. As a more particular example, in some embodiments, the received information can include navigation history as described above in connection with block 410, an indication of a group of users who are determined to have a relatively high affinity for the video and/or a topic associated with the video, and/or any other suitable information.

Process 400 can cause user indicators corresponding to the users in the subset of users to be presented on the user device associated with the first user at 414. In some embodiments, process 400 can cause the user indicators to be presented based on a ranking of the users within the subset of users. For example, in some embodiments, user indicators corresponding to users ranked more highly within the subset of users can be presented in a more prominent position in the group of user indicators (e.g., at the top of the group, at the left-most edge of the group, and/or in any other suitable position). As another example, in some embodiments, user indicators corresponding to the top N (e.g., one, two, and/or any other suitable number) users in the subset of users can be presented with a different visual appearance (e.g., highlighted, in a larger size and/or font, and/or in any other suitable manner) relative to other user indicators in the group of user indicators.

Note that, in some embodiments, the subset of users can be organized and/or grouped in any suitable manner. For example, in some embodiments, a first group of users within the subset of users can correspond to users determined to be likely to have an interest in the video (e.g., determined based on an affinity score as described above in connection with block 406). As another example, in some embodiments, a second group of users within the subset of users can correspond to users who have not been determined to be likely to have an interest in the video but who have been determined to have a connection with the first user (e.g., are friends on a social networking site, and/or any other suitable type of connection). In some such embodiments, users within each group can be further ranked within the group. For example, in some embodiments, users within the first group of users and the second group of users can be ranked (against other users within their respective group) based on the strength of the relationship of the user with the first user associated with the user device. In some embodiments, user indicators corresponding to users in the first group of users can be presented more prominently than user indicators corresponding to users in the second group of users. For example, in some embodiments, user indicators corresponding to users in the first group of users can be presented before (e.g., to the left of, on top of, and/or in any other suitable position) user indicators corresponding to users in the second group of users. As another example, in some embodiments, user indicators corresponding to users in the first group of users can be presented with a visual appearance differing from that of user indicators corresponding to users in the second group of users (e.g., in a different color, with a different transparency, and/or in any other suitable manner).

In some embodiments, each user indicator can include any suitable information. For example, as shown in FIG. 1, a user indicator can indicate a name and/or a username of the corresponding user and/or an image associated with the user. As another example, in some embodiments, the user indicator can indicate whether the corresponding user is currently active on a particular networking platform, and/or any other suitable information. Note that, in some embodiments, process 400 can additionally cause information indicating reasons why a particular user was included in the subset of users used to create the group of user indicators. For example, in some embodiments, the information can indicate that a particular user has watched related videos, a particular user belongs to a group associated with a topic related to the video, a particular user endorsed the video, and/or any other suitable information.

In some embodiments, at least some of the above described blocks of the process of FIG. 4 can be executed or performed in any order or sequence not limited to the order and sequence shown in and described in connection with the figures. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for indicating viewership of a video based on context are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for indicating media content viewership, comprising:
   receiving a request to present, on a user device, a first page that includes an indication of a media content item;
   identifying a group of users connected to a user of the user device;
   in response to receiving the request, determining a navigation history of the user device, wherein the navigation history indicates a second page associated with at least one user in the group of users that was previously viewed on the user device prior to receiving the request to present the first page that includes the indication of the media content item;
   determining whether the at least one user in the group of users has interacted with the media content item based on the navigation history; and
   in response to determining that the at least one user in the group of users has interacted with the media content item, causing the first page to be presented on the user device, wherein the first page includes the indication of the media content item and an indicator of the at least one user in the group of users.

2. The method of claim 1, further comprising determining, for each user in the group of users, an affinity score, wherein the affinity score indicates an interaction of each user in the group of users with the identified video.

3. The method of claim 1, further comprising determining, for the at least one user in the group of users, an affinity score that indicates a strength of a relationship between the at least one user and the user of the user device.

4. The method of claim 1, wherein determining whether the at least one user in the group of users has interacted with the media content item comprises determining whether the at least one user in the group of users has endorsed the media content item.

5. The method of claim 4, wherein determining whether the at least one user in the group of users has endorsed the media content item comprises determining whether the at least one user in the group of users has shared the media content item on a social networking website.

6. The method of claim 1, wherein the indicator of the at least one user in the group of users includes an icon corresponding to the at least one user in the group of users.

7. A system for indicating media content viewership, the system comprising:
a hardware processor that is programmed to:
receive a request to present, on a user device, a first page that includes an indication of a media content item;
identify a group of users connected to a user of the user device;
in response to receiving the request, determine a navigation history of the user device, wherein the navigation history indicates a second page associated with at least one user in the group of users that was previously viewed on the user device prior to receiving the request to present the first page that includes the indication of the media content item;
determine whether the at least one user in the group of users has interacted with the media content item based on the navigation history; and
in response to determining that the at least one user in the group of users has interacted with the media content item, cause the first page to be presented on the user device, wherein the first page includes the indication of the media content item and an indicator of the at least one user in the group of users.

8. The system of claim 7, wherein the hardware processor is further programmed to determine, for each user in the group of users, an affinity score, wherein the affinity score indicates an interaction of each user in the group of users with the identified video.

9. The system of claim 7, wherein the hardware processor is further programmed to determine, for the at least one user in the group of users, an affinity score that indicates a strength of a relationship between the at least one user and the user of the user device.

10. The system of claim 7, wherein determining whether the at least one user in the group of users has interacted with the media content item comprises determining whether the at least one user in the group of users has endorsed the media content item.

11. The system of claim 10, wherein determining whether the at least one user in the group of users has endorsed the media content item comprises determining whether the at least one user in the group of users has shared the media content item on a social networking website.

12. The system of claim 7, wherein the indicator of the at least one user in the group of users includes an icon corresponding to the at least one user in the group of users.

13. A non-transitory computer-readable medium containing computer executable instructions that, when executed by a processor, cause the processor to perform a method for indicating media content viewership, the method comprising:
receiving a request to present, on a user device, a first page that includes an indication of a media content item;
identifying a group of users connected to a user of the user device;
in response to receiving the request, determining a navigation history of the user device, wherein the navigation history indicates a second page associated with at least one user in the group of users that was previously viewed on the user device prior to receiving the request to present the first page that includes the indication of the media content item;
determining whether the at least one user in the group of users has interacted with the media content item based on the navigation history; and
in response to determining that the at least one user in the group of users has interacted with the media content item, causing the first page to be presented on the user device, wherein the first page includes the indication of the media content item and an indicator of the at least one user in the group of users.

14. The non-transitory computer-readable medium of claim 13, wherein the method further comprises determining, for each user in the group of users, an affinity score, wherein the affinity score indicates an interaction of each user in the group of users with the identified video.

15. The non-transitory computer-readable medium of claim 13, wherein the method further comprises determining, for the at least one user in the group of users, an affinity score that indicates a strength of a relationship between the at least one user and the user of the user device.

16. The non-transitory computer-readable medium of claim 13, wherein determining whether the at least one user in the group of users has interacted with the media content item comprises determining whether the at least one user in the group of users has endorsed the media content item.

17. The non-transitory computer-readable medium of claim 16, wherein determining whether the at least one user in the group of users has endorsed the media content item comprises determining whether the at least one user in the group of users has shared the media content item on a social networking website.

18. The non-transitory computer-readable medium of claim 13, wherein the indicator of the at least one user in the group of users includes an icon corresponding to the at least one user in the group of users.

* * * * *